Patented Apr. 3, 1945

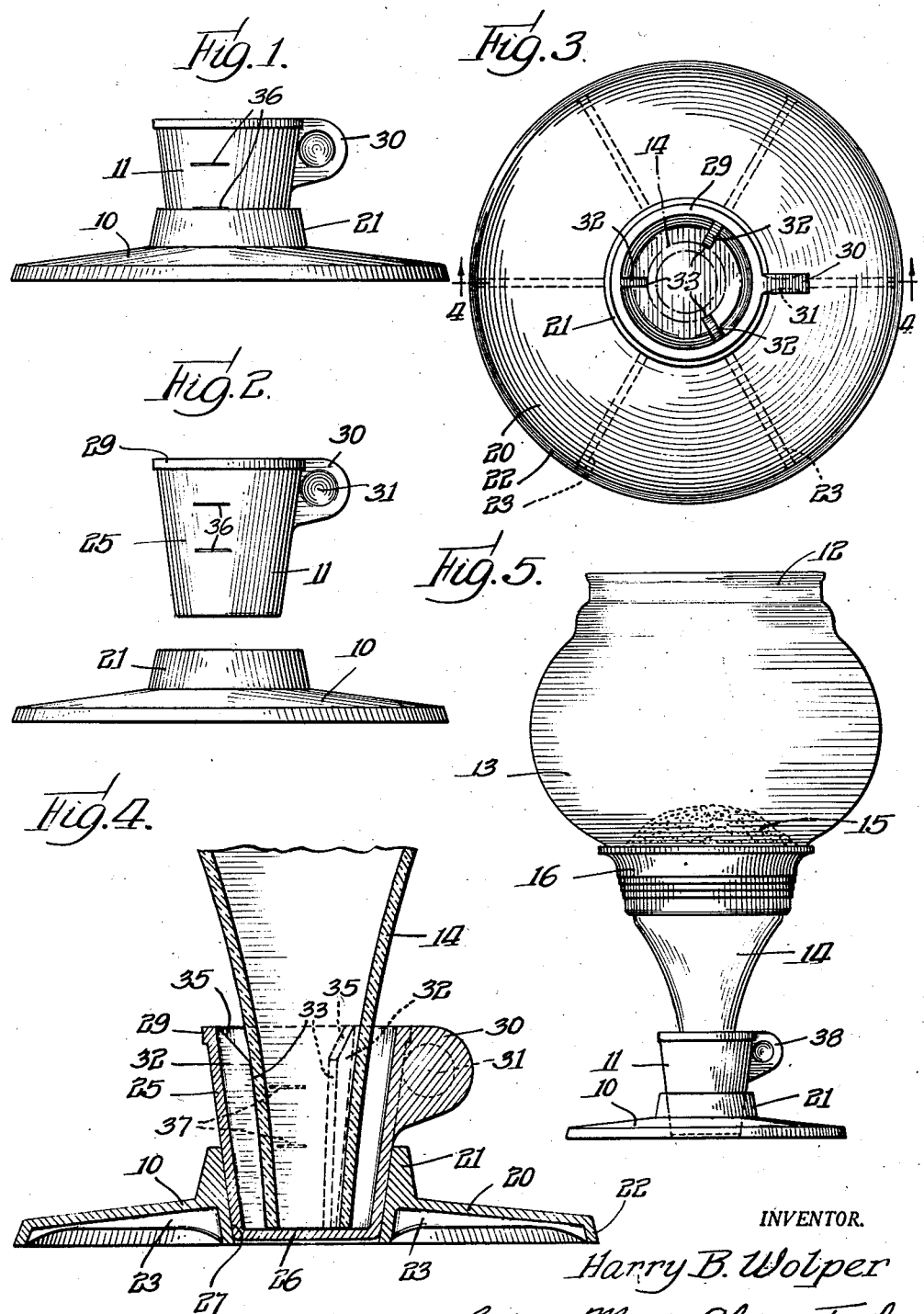

2,372,872

UNITED STATES PATENT OFFICE 2,372,872

AUXILIARY UNIT FOR BEVERAGE BREWERS

Harry B. Wolper, Chicago, Ill.

Application August 5, 1943, Serial No. 497,431

2 Claims. (Cl. 65—65)

This invention relates to the art of beverage brewing, and concerns more particularly auxiliary equipment for use with beverage brewers of the superposed bowl vacuum type.

It is an object of the invention to provide a unit, for use with vacuum type beverage brewers and the like, which unit is adapted for utility both to effect a measuring of the coffee grounds or other beverage concentrate to be used, and to effect a support for the upper bowl of the brewer structure in the use of the brewer apparatus.

A further object of the invention is to provide a unit or auxiliary for use with beverage brewers of the type stated, which unit may be readily assembled to provide a firm and adequate support for a part of the brewer apparatus, and readily disassembled so that a part of the support structure may be used to effect a measuring of the coffee grounds or other beverage concentrate.

A still further object of the invention is to provide an improved support and support arrangement for the upper bowl of a vacuum beverage brewer.

Various other objects, advantages and features of the invention will be apparent from the following specification when taken in connection with the accompanying drawing, wherein a preferred embodiment of the invention is set forth for purposes of illustration.

In the drawing, wherein like reference numerals refer to like parts throughout:

Fig. 1 is a general assembly view, in side elevation, of a measuring and support unit constructed in accordance with and embodying the principles of the invention;

Fig. 2 is a view similar to Fig. 1, but showing the parts of the support unit or structure disassociated, so that a portion thereof may be readily used as a measuring device;

Fig. 3 is a top plan view of the structure of Fig. 1, on an enlarged scale.

Fig. 4 is a vertical sectional detail view, on a further enlarged scale, and taken as indicated by the line 4—4 of Fig. 3, a portion of the beverage brewer bowl being shown in operative supported position; and Fig. 5 is a general assembly view illustrating the complete holder unit, and supported bowl, in assembled supporting position.

Referring more particularly to the drawing, the unit illustrated comprises a base portion 10 and a cup or holder portion 11 adapted to be arranged in superposed assembled position, as illustrated in Fig. 1, or in disassembled or separated condition, as illustrated in Fig. 2. When the parts are in their superposed or assembled position, as illustrated in Fig. 1, the cup or holder member 11, in combination with the base 10, is adapted to form a support for the upper bowl 12 of a vacuum type beverage brewer, for holding said bowl in upright position as shown in Fig. 5.

This bowl may be of any suitable type, but is preferably of the type illustrated in my copending application, Serial No. 492,820, filed June 30, 1943, and entitled "Beverage brewer and filter"; and as shown comprises an upper generally spherically-shaped bowl portion 13, and a depending tube portion 14. Vacuum beverage brewers of the type in question are frequently known as "glass coffee makers," and as will be understood, and as shown in said copending application, comprise a pair of bowls adapted to be arranged in superposed relation to effect the brewing of the beverage, such as coffee. In use, the coffee, as shown at 15 in Fig. 5, or other beverage concentrate, is first placed within the upper bowl 12, a suitable filter being disposed beneath the bed of coffee grounds for preventing them from falling downwardly through the tube 14. Water is then placed within the lower bowl, and after partial heating of the water the two bowls are arranged in superposed relation, the upper bowl gasket, as indicated at 16 in Fig. 5, being adapted to fit within the neck of the lower bowl and form a fluid-tight connection therewith. As heat is applied to the lower bowl, the resulting vapor pressure forces the water from the lower bowl upwardly into the upper bowl and into contact with the coffee grounds therein. Thereafter, as the source of heat is removed from the lower bowl, the resulting vacuum formed therein returns brewed liquid to the lower bowl through the filter, leaving the coffee grounds in the upper bowl member. As the two bowls are then separated so that the brewed coffee or beverage may be poured from the lower bowl for use, it is desirable that suitable means be provided so that the upper bowl may be readily supported in upright position, as shown in Fig. 5, so that the coffee grounds 15 therein will not be dislodged or inadvertently dumped from the bowl structure, until the bowl is ready for cleaning. Similarly it is desirable to provide such support means for the upper bowl, during the heating of the water in the lower bowl and before the upper bowl has been mounted thereon. The support of the present invention, when in the position or condition illustrated in Figs. 1 and 5, is adapted to perform these supporting functions. The structure is also arranged, however, so that the cup portion 11 thereof may be removed from the base 10, and when so removed readily used as a measuring device for measuring a predetermined quantity of the coffee grounds 15, or other beverage concentrate, to be placed within the upper bowl structure. This measuring function is ordinarily required at the beginning of the brewing operation, so that after the measuring, the cup 11 may be arranged within the base 10, as shown in Figs. 1 and 5, so that the support is thereupon adapted to receive the bowl of the coffee brewer, when required.

Referring more particularly to the details and features of construction, it will be seen that the base 10, as best shown in Fig. 4, comprises a generally circular body portion 20, an upstanding neck portion 21 disposed at the center part of the body, and a downwardly turned flange 22 provided at the outer edge thereof. A series of radially disposed reinforcing ribs 23 extend radially outwardly of the body, in suitably spaced relation, thereby imparting strength and rigidity to the body, while at the same time permitting the body proper to be made of a minimum weight stock. It is to be understood that the base 10 and cup 11 may be made of any suitable material such as glass, metal, plastic, et cetera. The downturned peripheral flange 22 also aids in imparting strength and rigidity to the base, and permits the body 20 to be spaced slightly above the support surface upon which the base is supported, whereby to minimize the probability of the base encountering irregularities on the support surface.

The cup portion 11 of the unit, as best shown in Figs. 2, 3 and 4, comprises a generally cup-shaped body having an angular upstanding side wall portion 25 and a base portion 26. The angular side wall portion 25 is shaped to conform to and adapted to fit snugly into a tapered central opening 27 provided in the neck of the base. As best shown in Fig. 4, when the parts are in assembled position as shown, the base 26 of the cup is spaced slightly above the lower plane of the base 10 so as not to contact the support surface upon which the base is resting. By this means the side wall 25 of the cup may be brought into snug-fitting engagement with the opening 27 in the base, when the base and cup are in assembled position. It is to be understood, however, that if desired the base opening 27 may be made of slightly increased size with respect to the cup so that the cup base 26 may be brought into engagement with the support surface, precluding or minimizing a snug engagement between the cup and the base opening. A snug engagement is preferred in the structure as illustrated, so that when the base and cup are in assembled condition, the unit may be handled or inverted, without causing the cup to be dislodged or to fall from the base member.

The upper edge of the cup side wall 25 is provided with a reinforcing or strengthening bead 29, and the cup side wall is further provided at one circumferential point thereon with a radially extending handle structure 30. This handle structure 30, having a finger gripping depression 31, facilitates removal of the cup from the base, and also facilitates manipulation of the cup when used as a measuring unit for the coffee grounds. The cup 10 is further provided with a series of radially inwardly extending ribs or webs 32, extending radially inwardly toward the center of the cup a predetermined distance, there being three of these webs provided in the particular embodiment illustrated. The inwardly facing surfaces 33 of these webs are shaped to conform to and collectively support the tube 14 of the brewer bowl structure 12. More particularly, the inwardly facing surfaces of these webs are curved longitudinally to conform with the curvature of the bowl tube 14, as will be best understood by reference to Fig. 4. Preferably, the relative proportioning of the parts is such so that the lower end of the bowl tube is brought into engagement with the cup base 26, as shown in Fig. 4, while the bowl tube is still slightly spaced from the web surfaces 33. In other words, in the preferred embodiment as illustrated, it is contemplated that the bowl tube 14 shall be brought into supported position upon the cup base 26, and while thus supported the cup ribs or webs 32 shall be in loose fitting contact with the bowl tube, so that the brewer bowl 12 may be readily lifted from the cup without any tendency to correspondingly raise the cup 11 or its base 10. The close juxta-positioning between the cup webs and the bowl tube causes the bowl 12 to be maintained in upright position, but without frictional grip between the parts. It is to be understood, however, that if desired a frictional gripping engagement between the webs and the bowl tube may be provided, by slightly increasing the radial length of the webs. The upper edges 35 of the webs 32 are preferably inwardly and downwardly inclined, as indicated in Fig. 4, to act as guide surfaces, thus facilitating the introducing of the bowl tube 14 into the cup and into supported position. The cup or holder member 11 will be of proper size to hold a suitable quantity of coffee grounds or other beverage concentrate, and is preferably graduated both exteriorly and interiorly with suitable indications as shown at 36 and 37 in Figs. 2 and 4.

It will be seen that the structure, when the cup 11 and base 10 are in assembled position as shown in Figs. 1, 4 and 5, provides the equivalent of a one piece support structure, providing a strong and firm support for the brewer bowl 12. When the support unit is in this condition, the bowl neck 14 may be readily introduced into and removed from the cup 11, as indicated, and when in the cup will be properly held in upright position. When the brewer bowl is not in supported position, the cup 11 may be readily removed from the base 10, the handle 30 facilitating this operation, and the cup thereupon expeditiously used as a measuring unit.

When the unit is used to support the brewer bowl, as shown in Fig. 4, the webs or ribs 23 of the base and 32 of the cup insure a rigid support structure, and the cooperative curved shaping between the surface of the bowl tube 14, and the inwardly directed surfaces 33 of the cup webs, insures an improved supporting of the brewer bowl in upright position, but without undue binding or friction between the parts. The cup webs 32 provide a minimum area of contact with the bowl tube, whether frictional contact or loose fitting engagement is desired, in either case facilitating ready removal of the bowl from the holder structure.

It is obvious that various changes may be made in the specific embodiments set forth without departing from the spirit of the invention. The invention is accordingly not to be limited to the specific structural embodiments shown and described, but only as indicated in the following claims.

The invention is hereby claimed as follows:

1. A support unit for use with vacuum beverage brewers of the type having an upper bowl member provided with a conical depending tube, said support unit comprising a base portion and a holder portion, the base portion being laterally extended for firm support upon a horizontal support surface and the holder portion being vertically upstanding and provided with a recess adapted to receive the depending tube of the beverage brewer upper bowl member, and said holder portion being provided with radially directed inwardly extending webs projecting into said recess and provided with downwardly convergent, longitudinally convex support surfaces for cooperative contact with said bowl member depending tube.

2. A support unit for use with vacuum type beverage brewers for supporting the upper bowl member thereof, said support unit comprising a base portion, said base portion being laterally extended for firm support upon a horizontal support surface, and said base portion being provided with a substantially central recess in its upper surface, and a cup-like holder portion removably disposed in said recess and held thereby, said holder portion being vertically upstanding and adapted to receive the depending tube of said beverage brewer upper bowl member, said holder portion being provided with radially inwardly directed webs for cooperative contact with the bowl member tube, and with a laterally directed handle.

HARRY B. WOLPER.